United States Patent Office 3,316,233
Patented Apr. 25, 1967

3,316,233
PROCESS AND CATALYST FOR THE POLYMERIZATION OF ETHYLENIC MONOMERS
Darrell C. Feay, Berkeley, Calif., assignor to The Dow Chemical Company, Midland, Mich., a corporation of Delaware
No Drawing. Filed Aug. 8, 1962, Ser. No. 215,539
11 Claims. (Cl. 260—93.7)

This invention relates to a novel class of catalysts for the polymerization of ethylenic monomers. It particularly pertains to new compositions of matter which are catalytically active in promoting the addition polymerization of ethylenic monomers, especially α-olefins such as ethylene, propylene and higher homologues, and especially in promoting such polymerization of propylene and higher α-olefins in a highly stereoregular manner to produce highly isotactic polymeric products. The invention also pertains to a method of making such catalysts and to the polymerization of ethylenic monomers such as α-olefins therewith.

It is known to polymerize olefins such as ethylene and propylene to high molecular weight substantially crystalline polymers at relatively low temperatures and pressures in contact with catalytically active compositions which are mixtures, for example, of a transition metal compound such as titanium tetrachloride or titanium trichloride and a reducing agent such as triethylaluminum. It is also known, e.g. from Belgian Patents 538,782 and 543,259, that α-olefins higher than ethylene, such as propylene, can polymerize in a stereoregular manner to produce isotactic polymer products whose properties are, for many purposes, advantageous over the properties of the random, i.e. atactic, products. It is further known from the aforementioned Belgian Patent 543,259 that the course of polymerization to random (atactic) or stereoregular (e.g. isotactic) polymer can be directed to a considerable extent by selection of the particle size and/or degree of crystallinity and/or solubility of the catalyst-forming components. Thus, it is indicated in the prior art just mentioned that the stereoregular polymerization of propylene, for example, to produce isotactic polymer is favored by using a catalyst composition of crystalline titanium trichloride and triethyl aluminum.

However, it is also known that the polymerization of propylene with the titanium trichloride-triethylaluminum catalyst still produces a considerable proportion of atactic polymer, at least in the order of about 15 weight percent, together with the desired isotactic polymer. Since the isotactic polymer is the desired product, it is a desideratum of the art to provide means to increase the polymerization yield of isotactic polymer product and to decrease the polymerization yield of atactic polymer by-product.

Moreover, polymerizations carried out at moderate temperatures with the titanium trichloride-triethylaluminum catalyst produce polymers having very high molecular weight which are difficult to fabricate, especially into filaments and fibers. It is also very difficult to purify the polymer and to remove the catalyst residue impurities to a satisfactory degree. At relatively higher temperatures the active catalyst is short lived, probably because of progressive reduction of the titanium compound even to the extent of forming titanium metal.

Accordingly it is among the desiderata of the art to polymerize α-olefins, particularly propylene, to isotactic polymers, to minimize the polymerization yield of atactic and low molecular weight polymer by-products, to control the molecular weight of the isotactic polymer product, to provide active and stable catalysts for such polymerization, and to provide polymer products which are readily purified of catalyst residue impurities.

It is an object of this invention to provide improved means for polymerizing ethylenic monomers, especially α-olefins. A more particular object is to provide method and means for promoting the addition polymerization of α-olefins such as ethylene and especially of propylene and higher α-olefins in a highly stereospecific manner to produce highly isotactic polymer products. In furtherance of such objects, it is also among the objects of this invention to provide new compositions of matter in catalysts for such polymerization, a method for making such catalysts, and a method of polymerizing ethylenic monomers, especially α-olefins, therewith. Still another object is to provide stereospecific catalyst compositions which are very stable, which are very active, which are very stereospecific in promoting polymerization of α-olefin to isotactic polymers with minimum formation of atactic polymer by-product, and which are readily removed from the polymer product. Another object is to provide means of polymerizing α-olefins whereby the molecular weight of the polymer product is readily controlled. Other objects and advantages of the invention will be evident in the following description.

The objects of this invention are attained in a method of polymerization of ethylenic monomers such as α-olefins and catalyst means therefor which are compositions of matter comprising a mixture of a compound of a transition metal of Group IV–B, V–B, VI–B or VIII of the Periodic Table of the Elements and a new organo-titanium-aluminum compound or composition of the kind hereinafter defined, all as set forth below.

The new catalyst compositions of this invention are composed of essential ingredients or components one of which is an organo-titanium-aluminum compound of a new class of compounds understood to have the general formula $$(cp)_2Ti[CH_2Al(CH_3)X]_2$$

wherein cp is a cyclopentadienyl moiety selected from the class of cyclopentadienyl and alkylcyclopentadienyl radicals and X is selected from the class of halogen and lower alkoxy radicals.

The new compounds and compositions of the class just referred to are fully described and claimed in copending United States patent application, Ser. No. 215,529 filed concurrently herewith by Darrell C. Feay, now U.S. Patent No. 3,274,223. Specific compounds of this kind are represented and illustrated by the compound having the formula $$(C_5H_5)_2Ti[CH_2Al(CH_3)Cl]_2$$

wherein $C_5H_5$ is the cyclopentadienyl radical and by other compounds (referring to the formula just given) wherein the cyclopentadienyl radicals are replaced by alkylcyclopentadienyl radicals and/or the chlorine atoms are replaced by fluorine, bromine, iodine, methoxy, ethoxy, propoxy, butoxy, hexyloxy and other lower alkoxy radicals. Alkylcyclopentadienyl groups include methylcyclopentadienyl, ethylcyclopentadienyl, propylcyclopentadienyl, butylcyclopentadienyl, hexylcyclopentadienyl, octylcyclopentadienyl and like groups. While systematic nomenclature of the new compounds has not been developed, the specific compound $$(C_5H_5)_2Ti[CH_2Al(CH_3)Cl]_2$$

may be named bis(cyclopentadienyl)bis(methyl, chloroaluminylmethyl)titanium, and other compounds of the new class may similarly be named from their specific formulae, such as $$(CH_3\text{—}C_5H_4)_2Ti[CH_2Al(CH_3)Cl]_2$$
$$(C_2H_5\text{—}C_5H_4)_2Ti[CH_2Al(CH_3)Cl]_2$$
$$(C_5H_5)_2Ti[CH_2Al(CH_3)F]_2$$
$$(C_5H_5)_2Ti[CH_2Al(CH_3)Br]_2$$
$$(C_5H_5)_2Ti[CH_2Al(CH_3)I]_2$$
$$(C_5H_5)_2Ti[CH_2Al(CH_3)(OCH_3)]_2$$

$(C_5H_5)_2Ti[CH_2Al(CH_3)(OC_2H_5)]_2$
$(C_5H_5)_2Ti[CH_2Al(CH_3)(OC_4H_9)]_2$ and other $(cp)_2Ti[CH_2Al(CH_3)X]_2$ compounds.

The preparation of the new $(cp)_2Ti[CH_2Al(CH_3)X]_2$ compounds, as described in the forementioned application Ser. No. 215,529 now U.S. Patent No. 3,274,223, is carried out by reacting together a bis(cyclopentadienyl)titanium (IV) compound with a methyl aluminum compound of kinds such that, on the basis of one mole of the titanium compound and two moles of the aluminum compound, there are supplied six methyl groups and two X groups, i.e. in accordance with the general equation of stoichiometric relationship:

$(cp)_2TiG_2 + Al(CH_3)_2G + Al(CH_3)_2G$
$= (cp)_2Ti[CH_2Al(CH_3)X]_2 + 2CH_4$ wherein two of the G's are $CH_3$ and the other two of the G's are X, e.g. one of the following stoichiometric proportions:

$(cp)_2TiX_2 + 2Al(CH_3)_3 = (cp)_2Ti[CH_2Al(CH_3)X]_2 + 2CH_4$ $(cp)_2TiX(CH_3) + Al(CH_3)_3 + Al(CH_3)_2X$
$= (cp)_2Ti[CH_2Al(CH_3)X]_2 + 2CH_4$ $(cp)_2Ti(CH_3)_2 + 2Al(CH_3)_2X$
$= (cp)_2Ti[CH_2Al(CH_3)X]_2 + 2CH_4$ wherein cp and X are as hereinbefore defined.

Thus, by way of specific example, the new compound $(C_5H_5)_2Ti[CH_2Al(CH_3)Cl]_2$ can be made (a) by reacting bis(cyclopentadienyl)titanium dichloride with trimethylaluminum, or (b) by reacting bis(cyclopentadienyl)methyl titanium chloride with a mixture of trimethylaluminum and dimethylaluminum chloride, or (c) by reacting bis(cyclopentadienyl)dimethyl titanium with dimethylaluminum chloride.

The new $(cp)_2Ti[CH_2Al(CH_3)X]_2$ compounds used in making the catalyst compositions of this invention are not merely complexes of a titanium compound with an aluminum compound in the nature of the complexes formed by admixing bis(cyclopentadienyl)titanium dichloride with triethylaluminum or higher trialkylaluminum compounds. Thus, it is believed that a very unstable complex formable from bis(cyclopentadienyl)titanium dichloride and trimethylaluminum at low temperatures may have the structure

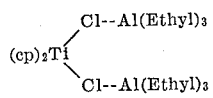

A more stable complex existing at higher temperatures and having a blue color is believed to have the structure

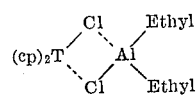

in which it will be seen that the titanium is trivalent.

In contrast to the complexes of the kind just mentioned, the new compounds employed in the catalyst compositions of this invention are believed to be true compounds having the probable structural formula

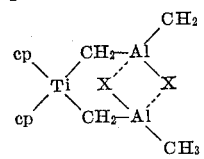

wherein the tetravalent titanium atom is uniquely linked to the aluminum atoms by covalent bonds through methylene ($-CH_2-$) linkages.

Further details concerning the preparation and properies of the new $(cp)_2Ti[CH_2Al(CH_3)X]_2$ compounds and compositions are included in the examples hereinbelow.

The new catalyst compositions of the present invention are mixtures of a compound of a transition metal of Group IV–B, V–B, VI–B or VIII of the Periodic Table of the Elements and a $(cp)_2Ti[CH_2Al(CH_3)X]_2$ compound of the new kind described above. Throughout this specification the Periodic Table of the Elements referred to is the one according to H.G. Deming, "Fundamental Chemistry," published (1952) by John Wiley & Sons, Inc. New York. Broadly contemplated, any compound of a transition metal (sometimes called the catalyst proper in the prior art) which can be activated by triethylaluminum (sometimes called the co-catalyst in the prior art) to provide a catalyst composition active in polymerizing olefins can be used in the present invention. Thus, compounds of titanium, zirconium, hafnium, vanadium, niobium, tantalum, chromium, molybdenum, tungsten, iron, cobalt, nickel, thorium and uranium can be used. The compounds, preferably of the metals in valence of two or more, can be any which are reducible with triethylaluminum, such as the halides, oxyhalides, freshly made hydroxides and oxides, and alkoxides, acetonylacetates, and the like. For purposes of making highly stereospecific polymers of propylene and higher α-olefins, it is desired and preferred that the transition metal compound catalyst or catalyst component be relatively insoluble and crystalline, such as well crystallized titanium trichloride, preferably the purple alpha-form of crystalline titanium trichloride, and vanadium trichloride.

The new catalyst compositions are catalytically active over wide ranges of proportions of the new kind of organo-titanium-aluminum compounds and the transition metal compound. Thus, the molar ratio thereof may vary from about 1:10 to 10:1. However, for any particular catalyst, ethylenic monomer, and polymerization procedure or purpose, the optimum mole ratio of catalyst composition may be readily determined by one skilled in the art.

The new catalyst compositions are prepared by admixing the $(cp)_2Ti[CH_2Al(CH_3)X]_2$ compound and the transition metal compound. Conveniently, the catalyst forming ingredients are admixed in the presence of an inert liquid diluent suitable for use as polymerization medium as described in detail below. Such procedure can directly provide a catalyzed polymerization reaction medium, or a concentrate can be made and subsequently further diluted to compose a catalyzed polymerization reaction medium. Alternatively, the catalyst-forming components separately, or a concentrated admixture thereof, can be fed to a polymerization reaction mixture together with polymerizable ethylenic monomer.

It is a feature of the present invention that the catalyst compositions are both active in polymerization and stable in that the nature and activity of the catalysts do not change readily on prolonged storage even at relatively higher temperatures. For example, a mixture of equimolar proportionate amounts of $(C_5H_5)_2-Ti[CH_2Al(CH_3)Cl]_2$ and $\alpha TiCl_3$ in heptane or xylene is stable. The $TiCl_3$ is not reduced to lower valence and/or metallic titanium even on prolonged standing. The catalyst mixture is an active initiator and sustainer of addition polymerization of propylene at temperatures from about room temperature to the order of about 165° C.

In accordance with the polymerization method of this invention, a polymerizable monomeric material is brought into contact with a catalyst composition as hereinbefore described. The polymerizable monomeric material preferably comprises one or more ethylenically unsaturated monomers, i.e. monomers having one or more

linkages, especially those having the general formula Q—CH=CH$_2$ wherein Q is any substituent which is not deleterious to the catalytic polymerizing activity of the catalyst, such as $\alpha$-olefins, including mono- and multi-olefins, and more particularly $\alpha$-olefins of the general formula Z—CH=CH$_2$ in which Z is hydrogen, alkyl, alkenyl, cycloalkyl, cycloalkenyl, aralkyl, aryl and alkaryl, such as ethylene, propylene, 1-butene, 1-pentene, 1-hexene, 3-methyl-1-pentene, vinyl cyclohexane, styrene, ar-vinyltoluene, vinylnaphthalene, etc. Mixtures of two or more olefins, such as mixtures of ethylene and propylene, ethylene and 1-butene, propylene and 1-butene, ethylene and propylene and 1-butene, etc. can be copolymerized. The unsaturated monomeric material may comprise or consist of other polymerizable monomers such as vinyl chloride, N-vinylcarbazole, acetylene, divinylbenzene, 1,3-butadiene, etc.

The polymerizations (by which is intended to include copolymerizations) are generally carried out with the monomeric material in a fluid phase, liquid or gaseous. Conveniently the polymerizations are carried out with the monomeric material in the liquid state or dissolved in inert liquid or liquefied solvents. Suitable inert liquid media are, for example, hydrocarbons such as methane, ethane, propane, butanes, pentanes, hexanes, heptanes, octanes, higher alkanes and mixtures of alkanes, cyclo-alkanes, purified paraffinic oils, purified kerosene, benzene, toluene, xylenes, ethylbenzene, cumene, cymene, tetrahydronaphthalene, decahydronaphthalene, and mixtures. For the slurry-type polymerizations, a liquid medium is chosen in which the polymer product is relatively insoluble, such as hexane or heptane for polypropylene. For the solution-type polymerizations, a liquid medium is selected in which the polymer product is relatively more soluble, such as xylene for polypropylene.

The polymerizations are carried out at polymerization reaction temperatures generally in the range from about room temperature to about 165° C. and at any desired pressure in batch or continuous manner.

At the completion of the polymerization step, the reaction is conveniently terminated by inactivating the catalyst, e.g. by adding to the reaction mixture an active hydrogen compound such as water, an acid, or an alcohol. It is a feature of the present invention that the polymer products are easily purified of the catalyst residues, e.g. by simple washing with water. After terminating the reaction and expurgating the product, the polymer can be recovered, dried if necessary, and fabricated in ways already known to the art.

The polymerization process is particularly advantageous for the making of highly stereoregular homopolymers by polymerization of polymerizable monomers of the general formula RCH:CH$_2$ wherein R is any group, other than hydrogen, which is chemically inert during the polymerization and non-deleterious to the catalytic polymerization activity of the catalyst, particularly where R is such a group in a hydrocarbon, halohydrocarbon or halogen radical. These advantages and features of the invention are well represented and illustrated in the stereoregular polymerization of propylene to form highly isotactic polypropylene as described below.

In the stereoregular polymerization of propylene to highly isotactic polypropylene, it is advantageous to polymerize the propylene in an inert hydrocarbon medium in the presence of one of the new catalyst compositions, especially one composed of crystalline $\alpha$-titanium trichloride and the compound

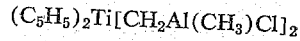

Particularly good results are obtained by using a catalyst composed of hydrogen-reduced and activated $\alpha$-TiCl$_3$ and from about one to about five moles of the compound

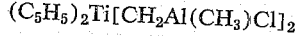

per mole of the TiCl$_3$. Particularly good results are obtained in slurry processes using highly purified and dry saturated aliphatic hydrocarbon liquids, and in solution processes using highly purified and dry aromatic hydrocarbon liquids, especially benzene, toluene, or xylenes, using catalyst concentrations equivalent to from about 0.1 to about 10, preferably from about 0.5 to about 5, millimoles of TiCl$_3$ per liter of hydrocarbon medium. Polymerization reaction temperatures are conveniently from about 50° C. to about 165° C., preferably from about 120° C. to about 150° C., under pressures which provide the desired partial pressure and concentration of propylene. It is a feature of this invention that the molecular weight of the polymer product and the rate of polymerization can readily be controlled by selection of the process conditions including the reaction temperature and pressure.

Polypropylene produced in accordance with the process of this invention is highly isotactic. Under optimum conditions of polymerization, the proportion of polymer product which is soluble in para-xylene at room temperature (mostly atactic, amorphous polymer) is found to be in the order of from about 4 percent by weight of the total polymer product, the balance being highly stereoregular, isotactic polypropylene, insoluble in xylene at room temperature.

EXAMPLES

The examples that follow illustrate the invention but are not to be construed as limiting its scope. In the examples parts and percentages are by weight unless otherwise indicated.

*Part A.—Preparation of organo-titanium-aluminum compounds for use in making polymerization catalysts*

PREPARATION A

One mole of bis(cyclopentadienyl)titanium dichloride mixed with one liter of n-heptane was mixed and reacted with 2.5 moles of trimethylaluminum at a temperature of about 90° C. for approximately one hour. Two moles of methane was evolved and a deep red liquid solution resulted. The reaction product was evaporated to dryness and the residue was heated at 95° C. under 3 mm. of mercury pressure in order to expel any unreacted trimethylaluminum or other simple methylaluminum compound by-products. The resulting dark red solid was rinsed with n-heptane and dissolved in xylene. The xylene solution was analyzed and found to be 0.416M with respect to titanium, 0.804M with respect to aluminum, and 0.800M with respect to chloride or in atomic ratios of Ti:Al:Cl of close to 1:2:2.

PREPARATION B

One mole of bis(cyclopentadienyl)titanium dichloride and two moles of trimethylaluminum were mixed without other solvent and reacted at 115° C. for approximately one hour. Two moles of methane were evolved. The resulting product was a dark red powder having analysis as follows:

|    | Found, percent | Calculated for $(C_5H_5)_2Ti[CH_2Al(CH_3)Cl]_2$, percent |
|----|---|---|
| Ti | 13.6 | 13.27 |
| Al | 14.5 | 14.94 |
| Cl | 19.2 | 19.64 |

The slightly higher value of titanium and slightly lower values of aluminum and chloride found relative to the calculated theoretical values are accounted for by the presence in the crude product of a small proportionate amount of titanium-containing impurity.

Analytical examination of the red compound as described in copending application Ser. No. 215,529 now U.S. Patent No. 3,274,223 confirms the probable formula $$(C_5H_5)_2Ti[CH_2Al(CH_3)Cl]_2$$

In the preparation of the compound $$(C_5H_5)_2Ti[CH_2Al(CH_3)Cl]_2$$

as described in the foregoing, the relative proportions of the trimethylaluminum and the bis(cyclopentadienyl) titanium dichloride starting materials can be varied as desired with either in excess but usually in the range of from about one to about five moles, preferably from about two to about three moles, of trimethylaluminum per mole of bis(cyclopentadienyl)titanium dichloride. The reaction may be carried out without a solvent but an inert liquid diluent medium is usually preferred. Suitable solvent-diluents are, for example, aliphatic hydrocarbons such as methane, ethane, propane, butanes, pentanes, hexanes, heptanes, octanes, higher alkanes, cyclohexane, methyl cyclopentane, and methylcyclohexane, aromatic hydrocarbons such as benzene, toluene, xylenes, ethylbenzene, cumene, and cymene, hydroaromatic hydrocarbons such as tetra- and deca-hydronaphthalene, and halogenated hydrocarbons such as dichloromethane, chloroform, carbontetrachloride dichlorodifluoromethane, ethylene chloride, perchloroethylene, chlorofluoroethanes, chlorobenzenes, chlorotoluenes, and the like. This reaction is accelerated by heat and is preferably carried out at temperatures from about 100° to about 125° C., not above about 135° C., and is usually practically complete in from about ½ hour to about 2 hours.

For purposes of making the catalyst compositions for use in the present invention the organo-titanium-aluminum compound may be isolated from its preparation reaction mixture or the reaction mixture per se may be used, providing any inert diluent liquid therein is a suitable polymerization medium. When the crude reaction product is to be used, without isolation and purification of the organo-titanium-aluminum compound, it is also preferred to employ as exactly as possible two moles of the trimethylaluminum per mole of the bis (cyclopentadienyl)titanium dichloride, for example. If more than two moles, e.g., 2.5 moles, of the trimethyl aluminum is used per mole of the bis(cyclopentadienyl) titanium dichloride in preparing the compound and the compound is not isolated or purified, it is usually preferred to carry out the polymerizations with catalysts made therefrom at temperatures not above about 130° C. if best results are to be obtained in terms of minimal formation of non-isotactic polymer by-product. Best results are obtained in the polymerization, e.g. of propylene, when the organo-titanium-aluminum compound from which the catalyst is prepared is isolated, purified, and preferably recrystallized.

The compound $$(C_5H_5)_2Ti[CH_2Al(CH_3)Cl]_2$$

is a dark red solid compound and is soluble in most hydrocarbons and chlorohydrocarbons from which it can be recrystallized, e.g. for purification. It reacts with water, which destroys it, forming methane. It also reacts with other active hydrogen compounds such as alcohols, acids, amines, etc. and with oxygen and carbon dioxide.

PREPARATION C

Into 150 mls. of dry xylene was slurried 10.0 grams (approximately 40 millimoles) of $(C_5H_5)_2TiCl_2$ and 7.21 g. (approximately 100 millimoles) of trimethylaluminum was added thereto at room temperature. The mixture was heated to 115° C. for one our, forming a deep red solution of the compound $$(C_5H_5)_2Ti[CH_2Al(CH_3)Cl]_2$$

thereafter cooling and holding the solution in the absence of air and moisture.

PREPARATION D

Equimolar amounts of bis(cyclopentadienyl) methyltitanium monochloride, dimethylaluminum chloride, and trimethylaluminum were mixed together in xylene solvent and heated to about 115° C. for about two hours. Two moles of methane were evolved. A deep red colored solution resulted from which was obtained the compound $$(C_5H_5)_2Ti[CH_2Al(CH_3)Cl]_2$$

described in preceding preparations.

PREPARATION E

One mole of bis(cyclopentadienyl)dimethyltitanium and two moles of dimethylaluminum chloride were admixed in xylene solvent and heated to about 115° C. for about two hours. Two moles of methane were evolved. A deep red colored solution resulted from which was obtained the compound $$(C_5H_5)_2Ti[CH_2Al(CH_3)Cl]_2$$

described in preceding preparations.

In place of the particular titanium compounds and aluminum compounds used as starting materials in the above preparations, there are used other starting materials in accordance with the general teachings hereinbefore given with substantially the same results.

It is essential that the starting materials be of kinds selected in accordance with the general equation hereinbefore given, i.e.

$$(cp)_2TiG_2 + Al(CH_3)_2G + Al(CH_3)_2G = (cp)_2Ti[CH_2Al(CH_3)X]_2 + 2CH_4$$

wherein two of the G's are methyl radicals and the other two G's are X radicals, X being halogen or a lower alkoxy radical and (cp) being a cyclopentadienyl or alkyl-substituted cyclopentadienyl radical as hereinbefore defined.

Part B.—Preparation of catalyst compositions and polymerization therewith

EXAMPLE 1

In this example, a catalyst composition was prepared by admixing, in 200 mls. of dry para-xylene, 0.038 gram (approximately 0.25 millimole) of hydrogen-reduced and activated alpha-titanium trichloride and 2.0 mls of the xylene solution of the red compound $$(C_5H_5)_2Ti[CH_2Al(CH_3)Cl]_2$$

described in Part A, Preparation (c). The admixture and resulting catalyst composition were made in a polymerization reactor which was closed, agitated and heated to 125° C. Propylene gas was fed into the reactor to a total pressure of about 140 p.s.i.g. (equivalent to about 110 p.s.i.g. partial pressure of propylene). These conditions were maintained for about four hours, after which the polymerization was terminated by adding five milliliters of water to the reaction mixture. The reactor and contents were allowed to cool to room temperature.

The resulting polymer slurry was filtered, and the solid polymer was washed with xylene at room temperature. An aliquot sample of the combined xylene filtrate and washes was evaporated to dryness and the net sample residue weight was used to calculate the amount of xylene soluble, amorphous, non-isotactic polymer product as 1.36 grams or 5.6 percent of the total weight of polymer product. The solid polymer insoluble in xylene at room temperature was washed with acetone containing HCl, then with acetone and dried in vacuo to obtain 22.9 grams (94.4 percent of the total weight of polymer product) of isotactic polypropylene. The yield of isotactic polypropylene was 603 grams per gram of TiCl₃ used in the catalyst.

The inherent viscosity of the isotactic polypropylene product, measured at 0.02 gram per 100 ml. concentration in decahydronaphthalene at 135° C., was 5.35 dl./gram from which a molecular weight value of 700,000 was calculated by the Mark-Houwink equation using the data of J. B. Kinsinger.

EXAMPLE 2

A catalyst composition was prepared by admixing, in 200 mls. of dry para-xylene in a polymerization reactor, 0.154 gram (about 1.0 millimole) of α-TiCl₃ and 4.0 mls. of the xylene solution described in Part A, Preparation (a), containing about 1.66 millimoles of the compound $(C_5H_5)_2Ti[CH_2Al(CH_3)Cl]_2$ The resulting mixture was heated with agitation to 125° C. and propylene was fed into a total pressure of about 140 p.s.i.g. (equivalent to about 110 p.s.i.g. partial pressure of propylene). These conditions were maintained for four hours after which the polymerization was terminated by adding five milliliters of water to the reaction mixture. The reactor and contents were cooled to room temperature.

The resulting polymer slurry was filtered, and the solid polymer was washed with xylene at room temperature (23° C.). An aliquot sample of the combined xylene filtrate and washes was evaporated to dryness and the net sample residue weight was used to calculate the amount of xylene-soluble, amorphous, non-isotactic polymer product as 1.14 grams. The solid polymer insoluble in xylene at room temperature was washed with acetone containing HCl, then with acetone, and dried in vacuo to obtain 18.8 grams of isotactic polypropylene. The yield if isotactic polypropylene is 94.3 percent of the total polymer product, 5.7 percent being the aforementioned amorphous, non-isotactic polymer. The isotactic polypropylene had an inherent viscosity of 4.40 measured at a concentration of 0.1024 gram per 100 ml. of decahydronaphthalene at 135° C., corresponding to a calculated molecular weight value of 500,000.

EXAMPLE 3

In a manner and under conditions basically like those shown in Example 2, propylene was polymerized in a reaction mixture comprising a catalyst composition prepared by feeding the catalyst-forming starting materials concurrently with the propylene. Substantially the same results were obtained when the catalyst was thus formed in situ as when the catalyst was preformed.

EXAMPLE 4

The preparation of the catalyst composition and reaction mixture and polymerization of propylene described in Example 2 were substantially repeated except that the xylene solvent-diluent was replaced with a highly purified saturated aliphatic hydrocarbon liquid with substantially the same results. The polymer product was highly isotactic, only 5.4 percent being soluble in xylene at room temperature and 94.6 percent being isotactic polypropylene.

EXAMPLES 5–9

To demonstrate the uniformly stable activity of the catalysts of this invention, a series of test polymerizations of propylene, identified as Examples 5 through 9, was carried out using, in the reaction mixtures, 200 mls. of dry para-xylene, 1.25 millimoles of α-TiCl₃ and 2.125 millimoles of $(C_5H_5)_2Ti[CH_2Al(CH_3)Cl]_2$ in the form of the xylene solution described in Preparation (c) of Part A (approximately 9 milliliters of such solution). In each test of the series, propylene was fed in at a total pressure of 140 p.s.i.g. while the reaction temperature was maintained in the range between 125° and 130° C. These are, therefore, "solution" polymerizations in that the polypropylene product remains in solution in the liquid phase of the reaction mixture throughout the polymerization step. One of the examples of the series was terminated at each of the times shown in Table 1 below and the polymer products were collected and analyzed as hereinbefore described. Table 1 shows, for each example, the elapsed time of polymerization to termination, the amorphous content of the polymer in percent thereof soluble in xylene at room temperature, the molecular weight value calculated from viscosity data for the isotactic polypropylene product, and the yield of isotactic polypropylene in grams per gram of TiCl₃ employed in the reaction. The table also shows the calculated rates of polymerization in grams of isotactic polypropylene produced per gram of TiCl₃ per hour. It will be observed that the rate of polymerization is practically uniform for the five examples of the series even though, since the tests were separate runs, more variability would be present in such a series than would have been present if a single larger test run had been representatively sampled at various time intervals for determination of rate of yield as a function of time.

TABLE 1

| Ex. | Poly'n Time, Hrs. | Polymer Product | | Yield of Isotactic Polymer | |
|---|---|---|---|---|---|
| | | Amorphous, Percent | MW×10⁻³ | Gms. per g. TiCl₃ | Rate, gms. g. TiCl₃/Hr. |
| 5 | 0.25 | 4.7 | 536 | 18 | 72 |
| 6 | 0.5 | 4.7 | 552 | 39 | 78 |
| 7 | 1 | 5.2 | 576 | 79 | 79 |
| 8 | 2 | 5.5 | 581 | 166 | 83 |
| 9 | 4 | 4.1 | 648 | 310 | 78 |

EXAMPLES 10–16

In this series of runs, propylene was polymerized at various temperatures. In each example there was used 200 mls. of dry para-xylene, 2.5 millimoles of α-TiCl₃, and 5 millimoles of the red compound $(C_5H_5)_2Ti[CH_2Al(CH_3)Cl]_2$ The mixtures just mentioned were heated to a temperature indicated in Table 2 and held there while propylene was fed into the reaction mixture at a total pressure of 120 p.s.i.g. for the time shown in Table 2. These polymerizations were of the kind known as "solution polymerization" in that the polypropylene products remained in solution in the liquid phase of the reaction mixture throughout the polymerization step. Each run was terminated by adding a little water to the reaction mixture and cooling it down to room temperature. The polymer products were recovered and analyzed as hereinbefore described. Table 2 also shows, for each example, the temperature maintained during the polymerization, the elapsed time of polymerization before termination, the amorphous content of the polymer in percent thereof soluble in xylene at room temperature, and the molecular weight value calculated from viscosity data for the isotactic polypropylene product. The table also shows the calculated mole fraction of propylene in the liquid phase of the polymerization reaction mixture.

It will be seen from Table 2 that there is an almost linear direct relationship between the temperature of polymerization and the percentage of polymer product which is atactic (soluble in xylene at room temperature). There is also seen so be an almost linear inverse rleationship between the polymerization reaction temperature and the molecular weight of the isotactic polypropylene product under the condtions employed. There is also found to be a nearly linear direct relationship between the mole fraction of propylene in the liquid phase of the reaction mixture and the molecular weight of the isotactic polypropylene product. In other words, the molecular weight of the polymer is a nearly linear function of the concentration of monomer in the reaction mixture.

Although, for analytical purposes, the amorphous (atactic) polymer fraction of the polymer product was separated from the isotactic polymer fraction in the above-described examples, it will be noted that such amorphous polymer fraction is generaly small. It is a feature of this invention that the polymer products, e.g. the total polypropylene product, as made with the catalysts and by the method of this invention are so highly isotactic that they can often be used without separation of the atactic portion. This feature is of particular value in the solution process embodiments of the polymerization process of this invention wherein it is more convenient to recover the entire polymer produce (e.g. by evaporation of the volatile inert liquid solvent medium) than to effect a separation of atactic from non-atactic polymer.

In place of the catalyst compositions used in the foregoing examples there can be used other catalyst compositions composed of mixture of a compound of a transition metal of Group IV–B, V–B, VI–B or VIII of the Periodic Table of the Elements and a compound of the general formula $$(cp)_2Ti[CH_2Al(CH_3X]_2$$

of kinds and prepared as herein before described with substantialy the same results in polymerizing ethylenic monomers. In place of propylene in the foregoing examples and with other catalyst compositions of this invention there can be used other ethylenic monomers as hereinbefore set forth with substantially the same results in actively initiating and sustaining polymerization and making additon polymers.

EXAMPLES 17–20

In these examples, several ethylenic monomers were polymerized in the presence of catalysts of this invention. The data are summarized in Table 3.

In Example 17, ethylene gas was suplied for 0.75 hour at a total presure of 80 p.s.i.g. to a reaction mixture at 130° C. comprising dry para-xylene and, based on that solvent, a catalyst composition composed of 1.25 millimoles per liter of α-TiCl$_3$ and 2.5 moles per liter of the red compound $$(C_5H_5)_2Ti[CH_2Al(CH_3)Cl]_2$$

The polymerization was terminated by adding water to the reactor, and the polymer was collected, washed and dired in conventional manner. The yield of polyethylene was 121 grams per gram of TiCl$_3$. Less than 2 percent of the polymer was soluble in room temperature xylene. The calculated molecular weight of the polyethylene was 790,000.

In Example 18, the procedure of Example 17 was repeated except that the catalyst composition was composed of 2.5 millimoles of VCl$_3$ and 5.0 millimoles of $$(C_5H_5)_2Ti[CH_2Al(CH_3)Cl_2]$$

per liter of xylene diluent and the reaction temperature was 125° C. The yield of polyethylene was 80 grams per gram of VCl$_3$ taken and the molecular weight of the polymer was calculated as 1,100,000.

In Example 19, 1-pentene was polymerized using itself as the liquid medium of polymerization containing a catalyst mixture of 10 millimoles of α-TiCl$_3$ and 20 millimoles of the red compound $$(C_5H_5)_2Ti[CH_2Al(CH_3)Cl]_2$$

per liter of 1-pentene. The reaction mixture was maintained at 70° C. for 20 hours, after which water was added to terminate the reaction and the polymer was collected in the usual way. The yield was 283 grams of poly (1-pentene) per gram of TiCl$_3$ taken.

In Example 20, styrene was polymerized in itself as liquid medium using a catalyst mixture of 10 millimoles of α-TiCl$_3$ and 20 millimoles of the red compound $$(C_5H_5)_2Ti[CH_2Al(CH_3)Cl]_2$$

per liter of styrene at a reaction temperature of 78° C. for 20 hours. The reaction was terminated by adding water and the polymer was collected in the usual way. There was obtained 216 grams of polystyrene per gram of TiCl$_3$ taken.

TABLE 2

| Ex. | Polymerization | | Polymer Product | | Propylene Mole Fraction |
| --- | --- | --- | --- | --- | --- |
| | Temp., °C. | Time, Hrs. | Amorphous, Percent | MW×10⁻³ | |
| 10 | 130 | 5 | 5.5 | 381 | 0.133 |
| 11 | 135 | 4.5 | 6.0 | 308 | 0.124 |
| 12 | 140 | 3 | 7.1 | 264 | 0.115 |
| 13 | 145 | 4.5 | 7.5 | 224 | 0.107 |
| 14 | 150 | 4.5 | 8.8 | 173 | 0.099 |
| 15 | 160 | 5 | 9.5 | 128 | 0.085 |
| 16 | 165 | 5.5 | 10.6 | 106 | 0.079 |

TABLE 3

| Ex. | Ethylenic Monomer | | Diluent | Catalyst Composition Millimoles per Liter of Diluent | | | Polymerization | | Yield of Polymer, Grams per Gram, of Metal Trichloride in Catalyst |
| --- | --- | --- | --- | --- | --- | --- | --- | --- | --- |
| | Kind | Amount | | TiCl$_3$ | VCl$_3$ | Red Cpd.* | Temp., °C. | Time, Hrs. | |
| 17 | Ethylene | 80 p.s.i.g | Xylene | 1.25 | | 2.5 | 130 | 0.75 | 121 |
| 18 | do | do | do | | 2.5 | 5.0 | 125 | 0.75 | 80 |
| 19 | 1-Pentene | 50 mls | Per se | 10 | | 20 | 70 | 20 | 283 |
| 20 | Styrene | do | do | 10 | | 20 | 78 | 20 | 216 |

*(C$_5$H$_5$)$_2$Ti[CH$_2$Al(CH$_3$)Cl]$_2$.

That which is claimed is:

1. A polymerization catalyst consisting essentially of a mixture of a compound of a transition metal selected from titanium trichloride and vanadium trichloride and per mole thereof from about 0.1 to about 10 moles of organo-titanium-aluminum compound of the general formula $$(cp)_2Ti[CH_2Al(CH_3)X]_2$$

wherein cp is a cyclopentadienyl moiety selected from the class consisting of cyclopentadienyl and alkylcyclopentadienyl radicals and X is selected from the class consisting of halogen and alkoxy radicals having from one to six carbon atoms.

2. A polymerization catalyst according to claim 1 wherein the compound of a transition metal is α-titanium trichloride.

3. A polymerization catalyst according to claim 1 wherein the compound of a transition metal is vanadium trichloride.

4. A polymerization catalyst consisting essentially of a mixture of α-titanium trichloride and from about 0.1 to about 10 moles of a compound of the formula $$(C_5H_5)_2Ti[CH_2Al(CH_3)Cl]_2$$

wherein $C_5H_5$ is the cyclopentadienyl radical per mole of the titanium trichloride.

5. A polymerization catalyst consisting essentially of a mixture of vanadium trichloride and per mole thereof from about 0.1 to about 10 moles of a compound of the formula $$(C_5H_5)_2Ti[CH_2Al(CH_3)Cl]_2$$

wherein $C_5H_5$ is the cyclopentadienyl radical.

6. A method of making a polymer by polymerizing an ethylenic monomer in an inert hydrocarbon medium and in contact with a polymerization catalyst according to claim 1 at polymerization temperature in the range from about 50° C. to about 165° C.

7. A method of making a polymer by polymerizing an α-olefin in an inert hydrocarbon medium and in contact with a polymerization catalyst according to claim 4 at polymerization temperature in the range from about 50° C. to about 165° C.

8. A method of making a polymer by polymerizing an α-olefin in an inert hydrocarbon medium and in contact with a polymerization catalyst according to claim 5 at polymerization temperature in the range from about 50° C. to about 165° C.

9. A method of making highly stereoregular polypropylene by polymerizing essentially propylene at a polymerization temperature in the range from about 50° C. to about 165° C. in a reaction mixture comprising an inert liquid hydrocarbon medium and a polymerization catalyst mixture consisting essentially of α-titanium trichloride and a red compound of the formula $$(cp)_2Ti[CH_2Al(CH_3)X]_2$$

wherein cp is a cyclopentadienyl moiety selected from the class consisting of cyclopentadienyl and alkylcyclopentadienyl radicals and X is selected from the class consisting of halogens and alkoxy radicals having from one to six carbon atoms, said α-titanium trichloride being present in proportionate amount of from about 0.1 to about 10 millimoles per liter of liquid hydrocarbon medium and said red compound being present in proportionate amount of from about one to about five moles per mole of the α-titanium trichloride.

10. A method according to claim 9 wherein the red compound has the formula $$(C_5H_5)_2Ti[CH_2Al(CH_3)Cl]_2$$

wherein $C_5H_5$ is the cyclopentadienyl radical.

11. A method of making highly stereoregular polypropylene by polymerizing essentially propylene at a polymerization temperature in the range from about 120° to about 150° C. in a reaction mixture comprising dry xylene and a polymerization catalyst mixture consisting essentially of α-titanium trichloride and a red compound of the formula $$(C_5H_5)_2Ti[CH_2Al(CH_3)Cl]_2$$

wherein $C_5H_5$ is the cyclopentadienyl radical, said α-titanium trichloride being present in proportionate amount of from about 0.5 to about 5 millimoles per liter of the xylene and said red compound being present in proportionate amount of from about one to about five moles per mole of the α-titanium trichloride.

References Cited by the Examiner

UNITED STATES PATENTS

| 2,827,446 | 3/1958 | Breslow | 260—94.92 |
| 2,952,670 | 9/1960 | Fischer | 260—93.5 |
| 3,073,811 | 1/1963 | Natta et al. | 260—94.945 |

FOREIGN PATENTS

| 240,482 | 7/1960 | Australia. |
| 858,540 | 1/1961 | Britain. |

JOSEPH L. SCHOFER, *Primary Examiner.*

JAMES A. SEIDLECK, *Examiner.*

E. C. EDWARDS, *Assistant Examiner.*